US012413958B2

(12) United States Patent
Jia et al.

(10) Patent No.: US 12,413,958 B2
(45) Date of Patent: Sep. 9, 2025

(54) DETECTION AND TRANSFER OF DEVICE CAPABILITIES BETWEEN DEVICES OF AN ECOSYSTEM OF DEVICES TO FACILITATE IMPROVEMENT OF A PERFORMANCE OF A DEFINED GROUP TASK OF THE ECOSYSTEM OF DEVICES

(71) Applicant: AT&T Intellectual Property I, L.P., Atlanta, GA (US)

(72) Inventors: Yupeng Jia, South Pasadena, CA (US); Rashmi Palamadai, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 540 days.

(21) Appl. No.: 17/945,817

(22) Filed: Sep. 15, 2022

(65) Prior Publication Data
US 2024/0098481 A1 Mar. 21, 2024

(51) Int. Cl.
*H04W 8/22* (2009.01)
*H04L 47/765* (2022.01)
*H04L 47/70* (2022.01)

(52) U.S. Cl.
CPC ............. *H04W 8/22* (2013.01); *H04L 47/765* (2013.01); *H04L 47/828* (2013.01)

(58) Field of Classification Search
None
See application file for complete search history.

(56) References Cited

U.S. PATENT DOCUMENTS

| | | | | |
|---|---|---|---|---|
| 8,135,859 B1 * | 3/2012 | Kelly | .................. | H04L 61/5014 709/201 |
| 10,827,329 B1 * | 11/2020 | Dowlatkhah | ......... | H04W 8/005 |
| 11,259,227 B1 * | 2/2022 | Sitaram | ............. | H04W 36/0085 |
| 2004/0187152 A1 * | 9/2004 | Francis | ................ | H04N 21/443 725/89 |
| 2004/0203797 A1 * | 10/2004 | Burr | ........................ | H04L 67/10 455/445 |
| 2011/0142042 A1 * | 6/2011 | Field | ..................... | H04L 63/104 370/390 |
| 2012/0011518 A1 * | 1/2012 | Duan | ...................... | G06F 9/505 718/104 |
| 2015/0065085 A1 * | 3/2015 | Sheikh Naziruddin | ..................... | H04M 15/7652 455/406 |

(Continued)

*Primary Examiner* — Adam Lee
(74) *Attorney, Agent, or Firm* — Guntin & Gust, PLC; Louis Yang

(57) ABSTRACT

Detection and transfer of device capabilities between devices of an ecosystem of devices to facilitate improvement of a performance of a defined group task of the ecosystem of devices is presented herein. An ecosystem of devices task improvement system creates the ecosystem of devices comprising respective devices to facilitate sharing respective device capabilities of the respective devices with the ecosystem of devices to increase a performance, via the ecosystem of devices, of the defined group task; in response to determining the defined group task to be performed by the ecosystem of devices, determines the respective device capabilities, and shares a portion of the respective device capabilities that corresponds to a first device of the respective devices with a second device of the respective devices to facilitate increasing the performance of the defined group task.

20 Claims, 10 Drawing Sheets

(56) References Cited

U.S. PATENT DOCUMENTS

| | | | |
|---|---|---|---|
| 2015/0370661 A1* | 12/2015 | Swanson | G06F 13/4027 |
| | | | 714/4.11 |
| 2016/0043962 A1* | 2/2016 | Kim | H04W 4/80 |
| | | | 709/224 |
| 2018/0139726 A1* | 5/2018 | Choi | H04L 67/1082 |
| 2018/0249521 A1* | 8/2018 | Kim | H04L 67/141 |
| 2018/0316768 A1* | 11/2018 | Goldsmith | H04L 67/52 |
| 2020/0142753 A1* | 5/2020 | Harwood | G06F 9/4856 |
| 2020/0159572 A1* | 5/2020 | Jägemar | G06F 9/5066 |
| 2020/0244668 A1* | 7/2020 | Grayson | H04W 12/08 |
| 2021/0392049 A1* | 12/2021 | Jeuk | G06N 20/00 |
| 2022/0303185 A1* | 9/2022 | Marshall | H04L 41/0893 |
| 2023/0206234 A1* | 6/2023 | Coker | G06Q 20/4097 |
| | | | 705/44 |

* cited by examiner

DETECTION AND TRANSFER OF DEVICE CAPABILITIES BETWEEN DEVICES OF AN ECOSYSTEM OF DEVICES TO FACILITATE IMPROVEMENT OF A PERFORMANCE OF A DEFINED GROUP TASK OF THE ECOSYSTEM OF DEVICES

TECHNICAL FIELD

The subject disclosure generally relates to embodiments for detection and transfer of device capabilities between devices of an ecosystem of devices to facilitate improvement of a performance of a defined group task of the ecosystem of devices.

BACKGROUND

As people desire to share information and/or participate in social, gaming, immersive, and/or other group-based technological experiences, they may find themselves wanting additional compute, communication, power, and/or other device based capabilities to effectively contribute to such experiences. Consequently, conventional technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
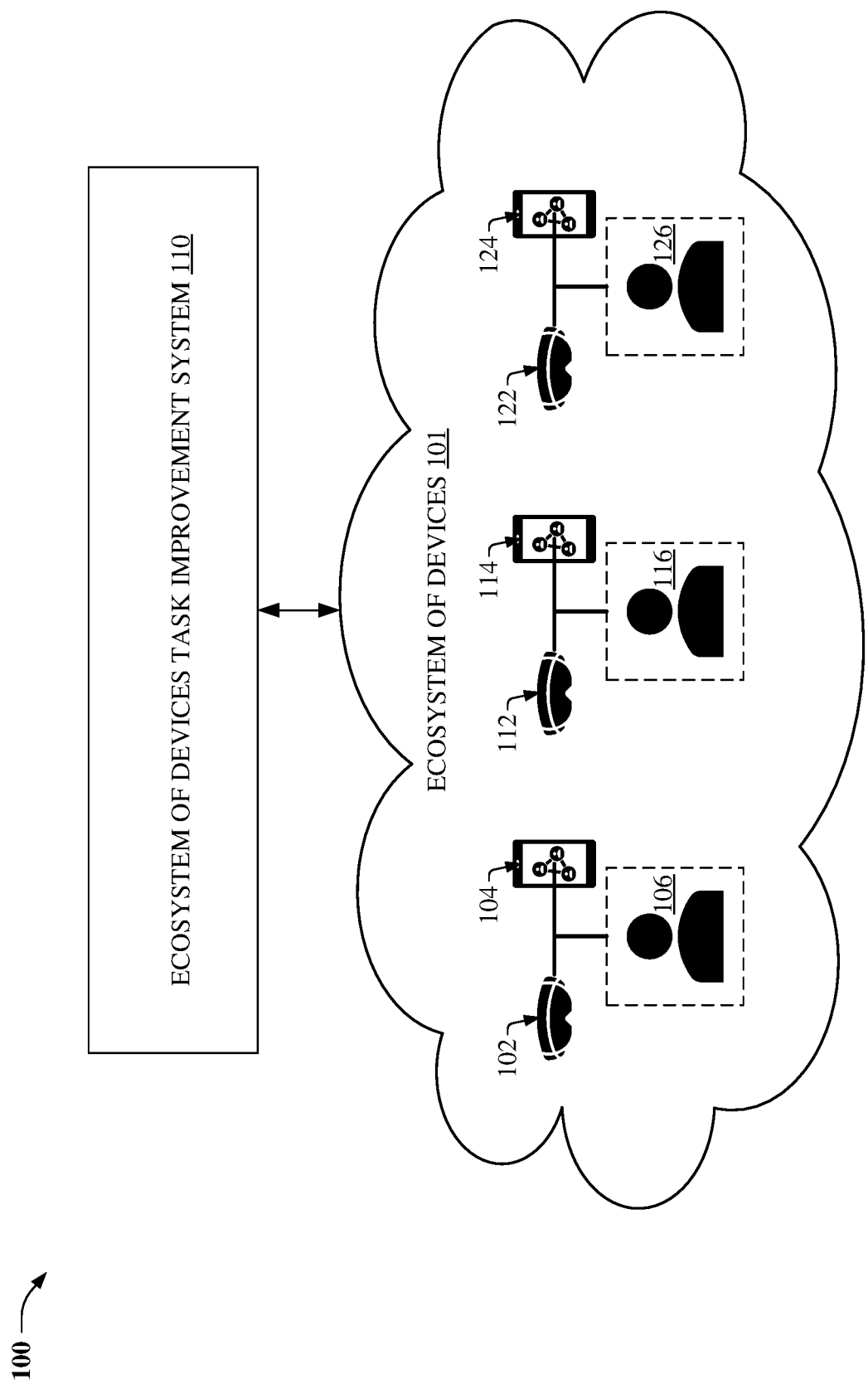
FIG. 1 illustrates a block diagram of an ecosystem of devices task improvement system environment that facilitates improvement of a performance of a defined group task of the ecosystem of devices, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, participants in social, gaming, immersive, and/or other group-based technological experience may desire additional compute, communication, power, and/or other device based capabilities to effectively contribute to such experiences. In various embodiments described herein, an ecosystem of devices task improvement system can facilitate improvement of a performance of a defined group, e.g., social, gaming, immersive, educational, and/or other group-based task of the ecosystem of devices.

For example, in embodiment(s), the ecosystem of devices task improvement system comprises an ecosystem of devices provisioning component and a device capability transfer component. The ecosystem of devices provisioning component creates a device group, e.g., an ecosystem of devices, comprising respective devices to facilitate sharing respective device capabilities of the respective devices with the ecosystem of devices to increase a performance, via the ecosystem of devices, of a defined group task.

In an embodiment, the ecosystem of devices provisioning component creates the ecosystem of devices in response to receiving, from a device of the ecosystem of devices (e.g., via a subscriber identity representing a subscriber of services provided by, e.g., a wireless service provider, a multimedia service provider, or other service provider corresponding to a social, gaming, immersive (e.g., AR-based, VR-based, MR-based, XR-based) and/or multimedia-based service), a request to create the ecosystem of devices and/or for the device to be included in the ecosystem of devices. Further, in response to the request to create the ecosystem of devices being determined to be authorized, and/or in response to the request for the device to be included in the ecosystem of devices being determined to be authorized, the ecosystem of devices provisioning component creates and/or includes the device in the ecosystem of devices.

In an embodiment, the device capability transfer component determines the defined group task to be performed by the ecosystem of devices and determines the respective device capabilities of the ecosystem of devices. In one embodiment, the defined group task corresponds to an immersive experience application, e.g., an augmented reality (AR) application, a virtual reality (VR) application, a mixed reality (MR) application, and/or an extended reality (XR) application. In another embodiment, the immersive experience application comprises a gaming application, an educational application, a streaming application, a cryptocurrency application, a connected car application, and/or a multimedia application.

In yet another embodiment, the respective device capabilities comprise a processing resource corresponding to a processing device of the a device of the ecosystem of devices, a memory resource corresponding to a memory device of the device, and/or a communication resource corresponding to a data transfer rate of a communication device of the device.

In turn, the device capability transfer component shares a portion of the respective device capabilities corresponding to a first device of the ecosystem of devices with a second device of the ecosystem of devices to facilitate increasing the performance of the defined group task.

In one embodiment, the device capability transfer component shares, via a wireless communication between the first device and the second device, the portion of the respective device capabilities with the second device—the wireless communication corresponding to an 802.11XX based communication protocol (e.g. WiFi, Bluetooth), a cellular based communication protocol (e.g., 4G, 5G, and beyond), a near-field based communication protocol, or a radio-frequency identification (RFID) communication protocol.

In an embodiment, in response the determining that the device is authorized to be included in the ecosystem of devices, the ecosystem of devices provisioning component determines a defined subscriber task of the defined group task that is to be performed by the device, and/or a defined subscriber rank, corresponding to the device, of a defined hierarchy of subscriber ranks corresponding to the ecosystem of devices, e.g., the subscriber rank corresponding to the subscriber identity.

In another embodiment, in response to determining that a first defined subscriber rank corresponding to the second device is greater than a second defined subscriber rank corresponding to the device, the device capability transfer component shares the portion of the respective device capabilities of the device with the second device.

In another embodiment, the device capability transfer component determines, e.g., during performance of the defined group task, whether first device capabilities of the first device are greater than second device capabilities of the second device. In this regard, in response to determining that the first device capabilities are greater than the second device capabilities, and in response to determining that sharing the portion of the first device capabilities of the first device with the second device satisfies a defined condition representing an increase of a device performance of the second device—with respect to increasing the performance of the defined group task—the device capability transfer component shares the first device capabilities with the second device.

In yet other embodiment, the device capability transfer component monitors the performance of the defined group task. Further, in response determining that re-allocation of the portion of the respective devices capabilities from the second device to a third device of the ecosystem of devices satisfies a defined condition representing an increase of a device performance of the third device with respect to increasing the performance of the defined group task, the device capability transfer component re-allocates the portion of the respective device capabilities from the second device to the third device.

In other embodiment(s), the ecosystem of devices task improvement system comprises a machine learning component that, utilizing machine learning model(s), monitors the performance of the defined group task, maps the sharing of the portion of the respective device capabilities with the performance of the defined group task to obtain a mapped result of the defined group task, and stores the mapped result in a data storage device.

In turn, the machine learning component determines, using the stored mapped result, whether sharing a portion of the respective device capabilities with a device of the respective devices corresponding to a subscriber identity of a subscriber associated with the device satisfies a defined condition representing an increase of a performance of a defined group task that is to be performed by the ecosystem of devices and/or that is being performed by the ecosystem of devices. In embodiment(s), the subscriber identity represents a subscriber of services provided by, e.g., a wireless service provider, a multimedia service provider, or other service provider corresponding to a social, gaming, and/or immersive (e.g., AR-based, VR-based, MR-based, XR-based) group experience and/or multimedia application.

In this regard, in response to determining that sharing the portion of the respective device capabilities satisfies the defined condition representing the increase of the performance of the defined group task, the machine learning component sends a recommendation directed to the subscriber identity requesting approval of the sharing based on subscriber user input, and/or shares, e.g., automatically, the portion of the respective device capabilities with the device to facilitate an increase of the performance of the defined group task.

In yet other embodiment(s), a method comprises forming, by a system comprising a processor, an ecosystem of devices to facilitate allocation of respective device capabilities of the devices with the ecosystem of devices for performance, via the ecosystem of devices, of a defined group task; and in response to determining the respective device capabilities, allocating, by the system, portion(s) of the respective device capabilities corresponding to a first device of the respective devices to a second device of the respective devices to facilitate enhancing the performance of the defined group task in accordance with a defined performance metric.

In embodiment(s), the method determines whether the allocation satisfies a defined condition representing an enhancement of a device performance of the second device with respect to enhancement of the performance of the defined group task. In this regard, in response to the allocation being determined to satisfy the defined condition representing the enhancement of the device performance with respect to the enhancement of the performance of the defined group task, the method allocates the portion of the respective device capabilities to the second device.

In other embodiment(s), the forming of the ecosystem of devices further comprises: receiving, from a device of the devices, a request to be included in the ecosystem of devices; and in response to the device being determined to be authorized to be included in the ecosystem of devices, including the device in the ecosystem of devices.

In yet other embodiment(s), in response to the device being included in the ecosystem of devices, the method determines, by the system for a subscriber identity corresponding to the device, a defined subscriber rank of a defined hierarchy of subscriber ranks corresponding to the ecosystem of devices.

In turn, in response to a first rank corresponding to the second device being determined to be greater than a second rank corresponding to the device, the method allocates a portion of the respective device capabilities corresponding to the device to the second device, e.g., to facilitate enhancing of a processing capability of the second device, a memory storage capability of the second device, and/or or a data transfer capability of the second device.

In embodiment(s), the method allocates the portion of the respective device capabilities to the second device using a wireless communication between the device and the second device, the wireless communication corresponding to an 802.11XX based communication protocol, a cellular based communication protocol, a near-field based communication protocol, and/or an RFID communication protocol.

In other embodiment(s), a machine-readable storage medium comprises executable instructions that, when executed by a processor, facilitate performance of operations, comprising: grouping devices that have been communicatively coupled, resulting in grouped devices, to enable sharing of respective device capabilities of the grouped devices with one another for optimization of a performance of a defined task to be undertaken by the grouped devices; and in response to determining the respective device capabilities of the grouped devices, sharing at least a portion of the respective device capabilities with the grouped devices to facilitate the optimization of the performance of the defined task.

In yet other embodiment(s), the sharing of the respective device capabilities further comprises sharing the portion of the respective device capabilities based on respective device ranks of a defined hierarchy of ranks that have been associated with the grouped devices.

Reference throughout this specification to "one embodiment," "an embodiment," and so on means that a particular feature, structure, or characteristic described in connection with the embodiment is included in at least one embodiment. Thus, the appearances of the phrase "in one embodiment," "in an embodiment," and so on in various places throughout this specification are not necessarily all referring to the same embodiment. Furthermore, the particular features, structures, or characteristics may be combined in any suitable manner in one or more embodiments.

As mentioned above, in a situation where multiple people with devices are getting together for a group social, gaming, and/or immersive experience, they may find themselves wanting additional compute, communication, and/or power capabilities. For example, among users present, one user may have a device with specific capabilities (e.g., hardware and/or software) that can be accessed and shared between the group.

In various embodiments described herein, an ecosystem of devices task improvement system can facilitate improvement of a performance of a group task (e.g., social, gaming, immersive, educational, and/or other defined task) of the ecosystem of devices by detecting, and transferring (e.g., using device-to-device communication techniques such as WiFi, Bluetooth; 4G, 5G, and beyond; near-field based communication(s); RFID communication(s) protocol, or other wireless-based communication protocol), device capabilities (e.g., processing based capabilities, memory based capabilities, communication based capabilities) between devices (e.g., gaming devices, VR headsets) of the ecosystem of devices.

In this regard, FIG. 1 illustrates a block diagram of an ecosystem of devices task improvement system environment (100) comprising an ecosystem of devices task improvement system (110) that facilitates improvement of a performance of a defined group task of the ecosystem of devices (101), in accordance with various example embodiments.

The ecosystem of devices comprises devices (102 104, 112, 114, 122, 124) that can include virtual reality headsets, game controllers, mobile devices, wireless devices, wired devices, display devices, or other devices, e.g., utilized by respective subscribers (106, 116, 126) of services provided by, e.g., a wireless service provider, a multimedia service provider, or other service provider corresponding to a social, a gaming, an educational, a streaming, a connected car, a cryptocurrency, an immersive (e.g., AR-based, VR-based, MR-based, XR-based) group experience, or other multimedia-based application.

Figure 2:
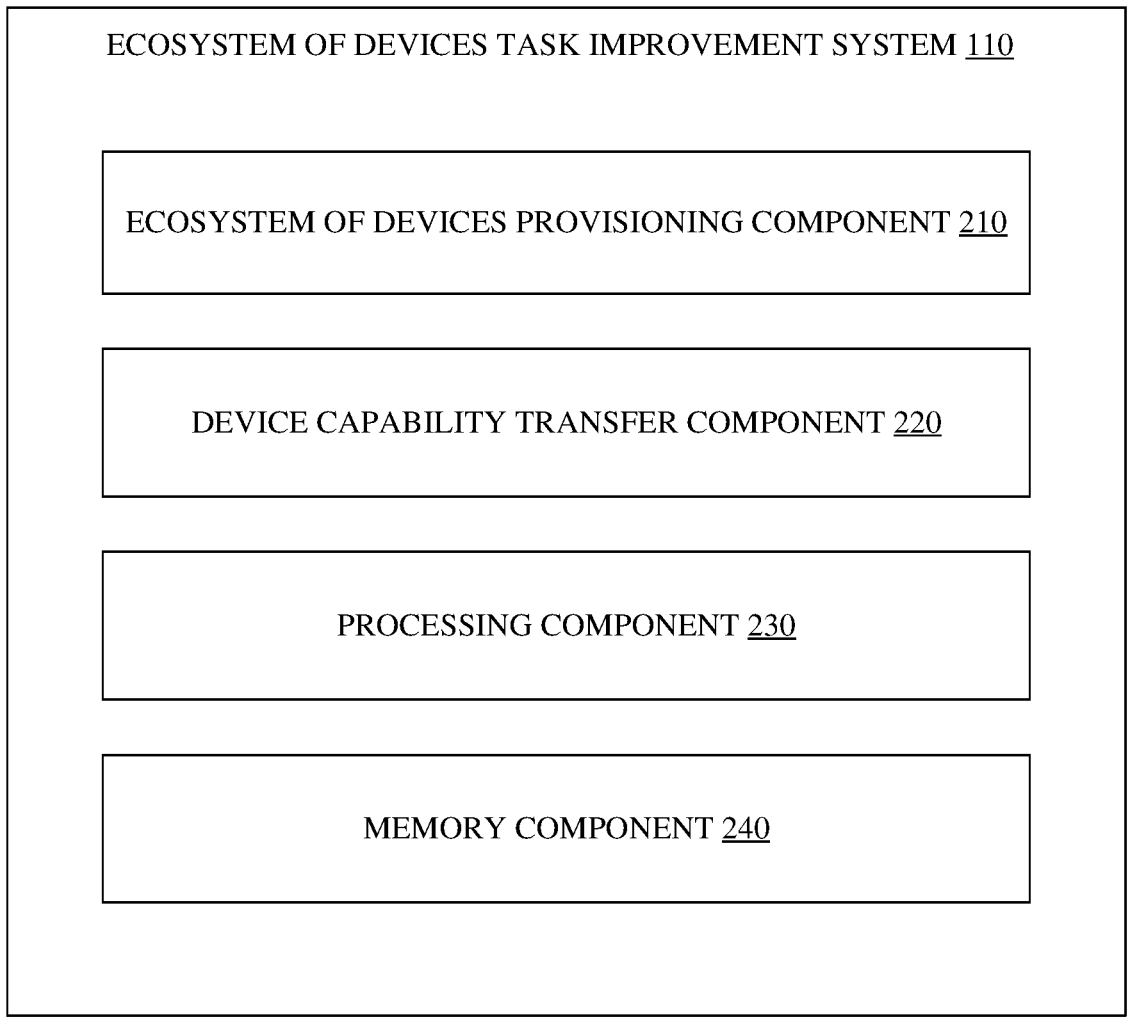
FIG. 2 illustrates a block diagram of an ecosystem of devices task improvement system that facilitates improvement of a performance of a defined group task of the ecosystem of devices, in accordance with various example embodiments.

As illustrated by FIG. 2, the ecosystem of devices task improvement system comprises an ecosystem of devices provisioning component (210), a device capability transfer component (220), a processing component (230), and a memory component (240). In embodiment(s), the memory component stores executable instructions that, when executed by the processing component, facilitate performance of operations described herein, e.g., via various components (e.g., 210, 220, 510) of the ecosystem of devices task improvement system.

The ecosystem of devices provisioning component creates a device group, e.g., the ecosystem of devices, comprising respective devices (102, 104, 112, 114, 122, 124) to facilitate sharing respective device capabilities of the respective devices with the ecosystem of devices to increase a performance, via the ecosystem of devices, of a defined group task.

In an embodiment, the ecosystem of devices provisioning component creates the ecosystem of devices in response to receiving, from a device of the ecosystem of devices (e.g., via a subscriber identity representing a subscriber of services provided by, e.g., a wireless service provider, a multimedia service provider, or other service provider corresponding to a social, gaming, immersive (e.g., AR-based, VR-based, MR-based, XR-based) and/or multimedia-based service), a request to create the ecosystem of devices and/or for the device to be included in the ecosystem of devices. Further, in response to the request to create the ecosystem of devices being determined to be authorized, and/or in response to the request for the device to be included in the ecosystem of devices being determined to be authorized, the ecosystem of devices provisioning component creates and/or includes the device in the ecosystem of devices.

In turn, the device capability transfer component shares a portion of the respective device capabilities corresponding to a first device of the ecosystem of devices with a second device of the ecosystem of devices to facilitate increasing the performance of the defined group task.

In one embodiment, the device capability transfer component shares, via a wireless communication between the first device and the second device, the portion of the respective device capabilities with the second device—the wireless communication corresponding to an 802.11XX based communication protocol (e.g. WiFi, Bluetooth), a cellular based communication protocol (e.g., 4G, 5G, and beyond), a near-field based communication protocol, or a radio-frequency identification (RFID) communication protocol.

In another embodiment, the defined group task corresponds to an immersive experience application, e.g., an AR application, a VR application, an MR application, and/or an XR application. In yet another embodiment, the immersive experience application comprises a gaming application, an educational application, a streaming application, a cryptocurrency application, a connected car application, and/or a multimedia application.

In an embodiment, the respective device capabilities comprise a processing resource corresponding to a processing device of a device of the ecosystem of devices, a memory resource corresponding to a memory device of the device, and/or a communication resource corresponding to a data transfer rate of a communication device of the device.

Figure 3:
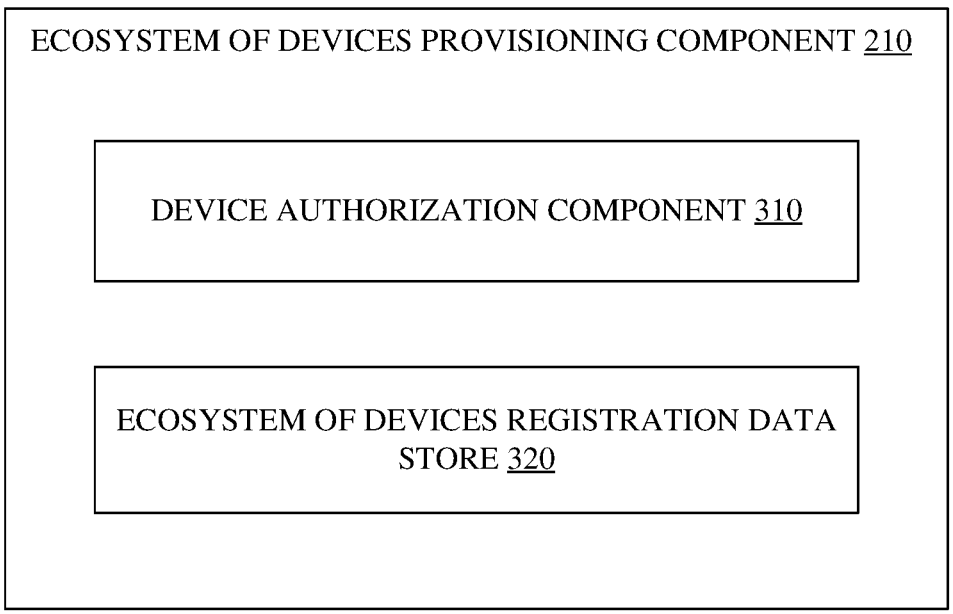
FIG. 3 illustrates a block diagram of an ecosystem of devices provisioning component of an ecosystem of devices task improvement system that facilitates improvement of a performance of a defined group task of the ecosystem of devices, in accordance with various example embodiments.

Referring now to FIG. 3, the ecosystem of devices provisioning component comprises a device authorization component (310) and an ecosystem of devices registration data store (320). The device authorization component obtains, from the ecosystem of devices registration data store, authorization information representing devices that have been registered, e.g., authorized, to be members of the ecosystem of devices.

In one embodiment, the ecosystem of devices provisioning component can obtain, e.g., from the ecosystem of devices registration data store, group task information representing the defined group task to be performed by the ecosystem of devices; subscriber task information representing a defined subscriber task of the defined group task that is to be performed by a device, of authorized devices, corresponding to the subscriber; subscriber rank information representing a defined subscriber rank, corresponding to the device, of a defined hierarchy of subscriber ranks corresponding to respective subscribers of the services; and respective device capability information representing the respective device capabilities.

In another embodiment, in response to the ecosystem of devices provisioning component receiving, from a device, a request to be included in the ecosystem of devices, the device authorization component determines, via the ecosystem of devices registration data store, whether the device is authorized to be included in the ecosystem of devices.

In this regard, in response to the device being determined, based on information that has been stored in the ecosystem of devices registration data store, to be authorized to be included in the ecosystem of devices, the ecosystem of devices provisioning component includes the device in the ecosystem of devices, and updates the ecosystem of devices registration data store with information representing that the device has been included in the ecosystem of devices.

In an embodiment, in response to the ecosystem of devices provisioning component receiving, from a device, a request to create the ecosystem of devices, the device authorization component determines, via the ecosystem of devices registration data store, whether the device has been authorized to request creation of the ecosystem of devices. In this regard, in response to the device being determined, based on information that has been stored in the ecosystem of devices registration data store, to be authorized to request creation of the ecosystem of devices, the ecosystem of devices provisioning component creates the ecosystem of devices, and updates the ecosystem of devices registration data store with information representing such creation.

Figure 4:
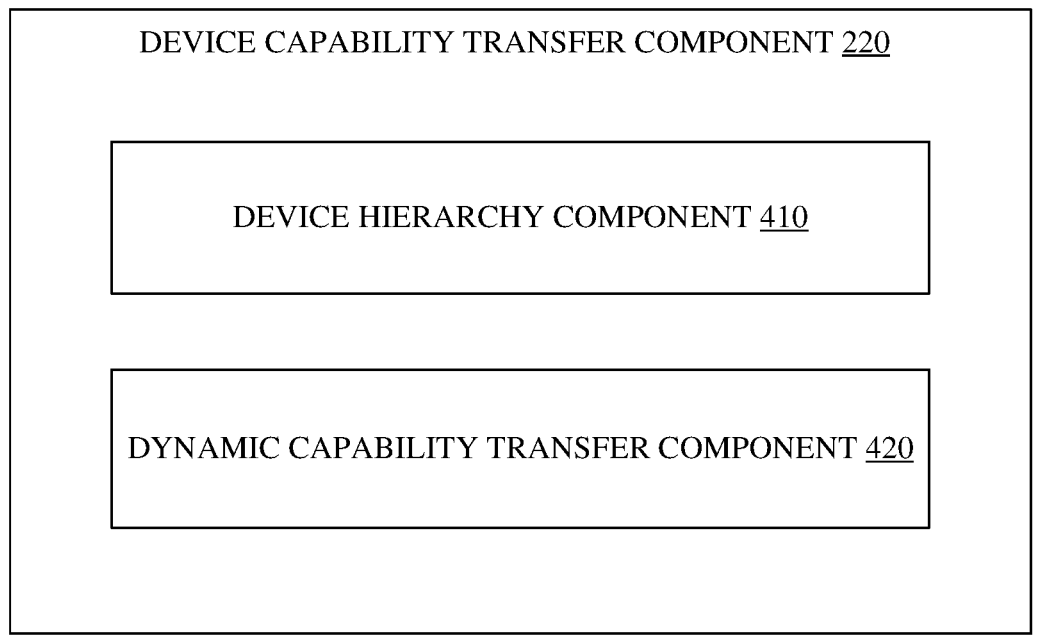
FIG. 4 illustrates a block diagram of a device capability transfer component of an ecosystem of devices task improvement system that facilitates improvement of a performance of a defined group task of the ecosystem of devices, in accordance with various example embodiments.

Referring now to FIG. 4, the device capability transfer component comprises a device hierarchy component (410) and dynamic capability transfer component (420). In an embodiment, in response the determining that a device is authorized to be included in the device group, the ecosystem of devices provisioning component can determine a defined subscriber task of the defined group task that is to be performed by the device, and/or determine, via the device hierarchy component, a defined subscriber rank, corresponding to the device, of a defined hierarchy of subscriber ranks corresponding to the ecosystem of devices, e.g., the subscriber rank corresponding to the subscriber identity.

In turn, in another embodiment, in response to determining that a first defined subscriber rank corresponding to the second device is greater than a second defined subscriber rank corresponding to the device, the device hierarchy component can share the portion of the respective device capabilities of the device with the second device.

In another embodiment, the device capability transfer component determines whether first device capabilities of the first device are greater than second device capabilities of the second device, e.g., with respect to performance of respective defined subscriber tasks of the defined group task corresponding to the first device and the second device. In this regard, in response to determining that the first device capabilities are greater than the second device capabilities, and in response to determining that sharing the portion of the first device capabilities of the first device with the second device satisfies a defined condition representing an increase of a device performance of the second device with respect to increasing the performance of the defined group task, e.g., via increasing performances of at least one of the respective defined subscriber tasks, the device capability transfer component shares the first device capabilities with the second device.

In embodiment(s), the device capability transfer component can determine device capabilities of the respective devices by, e.g., periodically, querying the respective devices for their device capabilities including an amount of available, e.g., battery power, processing capability, memory capability, and/or communication bandwidth device capability.

In other embodiment(s), the device capability transfer component can receive, from the respective devices, respective requests for the device capability transfer component to initiate the sharing of device capabilities. In this regard, a device of the respective devices can determine that an amount of available, e.g., battery power, processing capability, memory capability, and/or communication bandwidth device capability of the device is lower than a defined threshold representing a minimum amount of available device capability for the device to perform a defined subscriber task associated with the device. In turn, the device can send a request to the device capability transfer component to initiate the sharing of device capabilities with the device.

For example, in response to determining that the first device capabilities representing an available battery power of the first device are greater than the second device capabilities representing an available battery power of the second device; and in response to determining that sharing the portion of the first device capabilities of the first device with the second device satisfies a defined condition representing an increase of a device performance of the second device with respect to increasing the performance of the defined group task (e.g., via increasing performances of at least one of the respective defined subscriber tasks) the device capability transfer component can initiate performance, by the first device, of a defined subscriber task that has been assigned and/or performed by the second device, e.g., initiating the performance, via processor(s) of the first device, of operations corresponding to a defined subscriber task that has been assigned to or that has been performed by the second device.

In embodiment(s), the portion of the capabilities can include a rendered image and/or an enhanced image, e.g., comprising a zoomed in portion of a full image. In this regard, in response to determining that first imaging processing capabilities of the first device corresponding to generation of the zoomed in portion of the image are greater than second image processing capabilities of the second device, and in response to determining that sharing the image processing capabilities of the first device with the second device satisfies a defined condition representing an increase of a device performance of the second device with respect to increasing the performance of the defined group task, the device capability transfer component can initiate generation, by the first device, of the zoomed in, e.g., or enhanced portion of the image.

In turn, the device capability transfer component can share the enhanced portion of the image with the second device, and the second device can display, via a display device of the second device, the enhanced image to facilitate performance of a defined subscriber task of the defined group task corresponding to the second device.

In other embodiment(s), the first device, the second device, and a third device of the ecosystem of devices can perform a defined group task of presenting multimedia content, e.g., a movie and/or a live steamed event, on a wall and/or screen. In this regard, a defined subscriber task that is to be performed by the second device includes projecting, as a virtual projector, images of the multimedia content on the wall and/or screen. Further, respective defined subscriber tasks corresponding to the first device and the third device include respective processing and/or generating images of the multimedia content, e.g. such tasks assigned to the first device and the third device based on a determination that processing capabilities of the first device and the third device are greater than processing capabilities of the second device.

In turn, the device capability transfer component can share, via respective wireless communications (e.g., 4G, 5G, and beyond cellular based communications) respective portions of the processed and/or generated images with the second device, and the second device can display and/or project such portions on the wall and/or screen.

In yet other embodiment(s), a first group of devices of the ecosystem of devices can be selected, e.g., via subscriber inputs and/or the device capability transfer component, to generate first respective images using first respective hardware and/or software resources and/or capabilities of the first group of devices. In turn, a second group of devices of the ecosystem of devices can be selected, e.g., via subscriber inputs and/or the device capability transfer component, to generate second respective images using second respective hardware and/or software resources and/or capabilities of the second group of devices—the first respective hardware and/or software resources and/or capabilities being greater than the second respective hardware and/or software resources and/or capabilities, and the first respective images representing foreground images of a first quality and/or detail that is greater than a second quality and/or detail of the second respective images (e.g., the first respective images representing avatars and/or action figures of a video game, and the second respective images representing background images of the video game).

In turn, the device capability transfer component can share, via first respective wireless communications, the first respective images with the second group of devices; and share, via second respective wireless communications, the second respective images with the first group of devices.

In yet other embodiment, the dynamic capability transfer component monitors the performance of the defined group task. Further, in response determining that re-allocation of the portion of the respective devices capabilities from the second device to a third device of the ecosystem of devices satisfies a defined condition representing an increase of a device performance of the third device with respect to increasing the performance of the defined group task, e.g., via increasing performances of one of the respective defined subscriber tasks corresponding to the third device, the device capability transfer component re-allocates the portion of the respective device capabilities from the second device to the third device.

For example, the dynamic capability transfer component can determine device capabilities of the respective devices by, e.g., periodically, querying the respective devices for their device capabilities including an amount of available, e.g., battery power, processing capability, memory capability, and/or communication bandwidth device capability. In turn, based on a determination that re-allocating portion(s) of the respective devices capabilities among the device(s) satisfies a defined condition with respect to increasing the performance of the defined group task, the dynamic capability transfer component can automatically, e.g., initiate performance, by the first device, of operations that have been assigned to or that have been performed by the second device; initiate generation, by the first device, of enhanced portion(s) of the images, and share the enhanced portion(s) of the images with the second device, in which the second device can display, via a display device of the second device, the enhanced image to facilitate performance of the defined group task.

Figure 5:
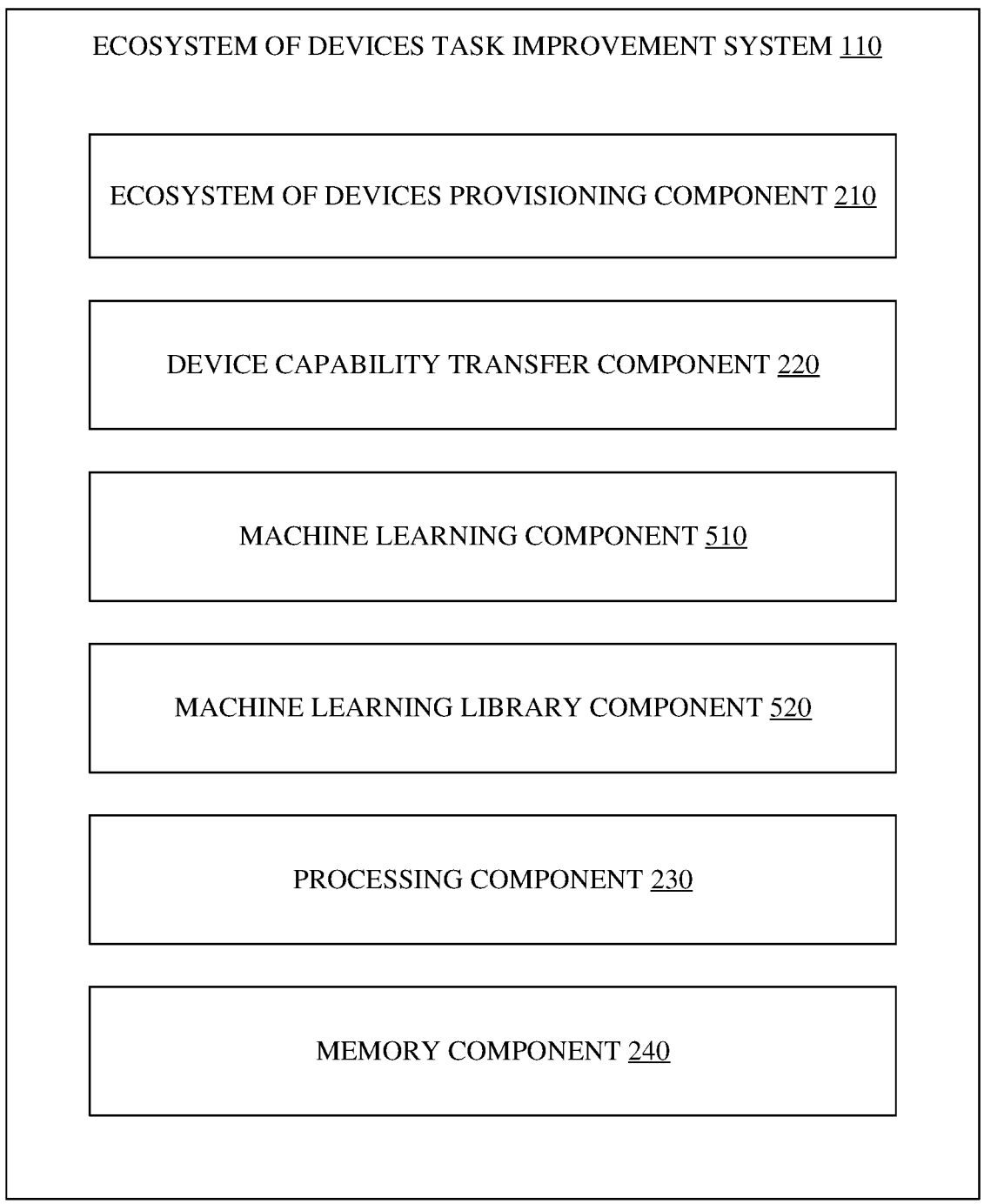
FIG. 5 illustrates a block diagram of an ecosystem of devices task improvement system including a machine learning component that facilitates improvement of a performance of a defined group task of the ecosystem of devices, in accordance with various example embodiments.

Referring now to FIG. 5, a block diagram of an ecosystem of devices task improvement system including a machine learning component (510) that facilitates improvement of a performance of a defined group task of the ecosystem of devices is illustrated, in accordance with various example embodiments.

The machine learning component, e.g. an artificial intelligence (AI) based component, utilizes machine learning model(s) (e.g., a decision tree based learning model, a linear regression based learning model, and/or a Bayesian based learning model) corresponding to respective machine learning processes to optimize, e.g., via a feedback loop, specific allocations of device capabilities that would improve performance of defined subscriber task(s) and/or the defined group task.

In this regard, the machine learning component monitors respective performances of the defined group task and respective defined subscriber tasks, maps the sharing of the portion of the respective device capabilities with the respective performances to obtain respective mapped results, and stores the respective mapped results in a data storage device, e.g., machine learning library component 520.

In this regard, the machine learning component can utilize various support vector machines that can be configured, via a learning or training phase utilizing classifier(s), to automatically learn and perform a number of functions, e.g., performed by the ecosystem of devices task improvement system. An example classifier can be a function that maps an input attribute vector, $x=(x1, x2, x3, x4, xn)$ (e.g., representing a device capability), to a confidence that the input belongs to a class), that is, $f(x)$=confidence (class), e.g., the input attribute vector representing that the device capability satisfies a defined condition with respect to improving a performance of a defined group task and/or a performance of a defined subscriber task corresponding to the device). Such classification can employ a probabilistic and/or a statistical-based analysis (e.g., factoring into the analysis utilities and costs) to prognose or infer an action that can be automatically performed, e.g., sharing, allocating, and/or re-allocating device capabilities between the ecosystem of devices.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence. Classification as used herein also may be inclusive of statistical regression that is utilized to develop models of priority.

The disclosed aspects can employ classifiers that are explicitly trained (e.g., via a generic training data) as well as implicitly trained (e.g., based on data that has been stored in the machine learning library component) with respect to triggering events, observing whether respective task performances satisfy corresponding defined conditions (e.g., such conditions representing an increase of a device performance with respect to increasing the performance of the defined subscriber task and/or the defined group task, network operating conditions, receiving extrinsic information, and so on). For example, SVMs can be configured via a learning or training phase via the machine learning component.

In embodiment(s), the machine learning component maps the known device capabilities and corresponding results of performances of the respective defined subscriber tasks using metadata representing contextual information corresponding to successful performance(s) of the defined group task. In this regard, in embodiment(s), the machine learning component can train, refine, and/or generate respective classifier(s) and/or SVMs Thus, the classifier(s) can be used, via the machine learning component, to automatically learn and perform a number of functions, predict and/or anticipate event(s)/condition(s), e.g., including but not limited to: monitoring the performance of the defined group task; monitoring the performance of the defined subscriber task; mapping the sharing of the portion of the respective device capabilities with the performance of the defined group task to obtain a mapped result of the defined group task, e.g., mapping respective device capabilities of the ecosystem of devices with respective performances of respective defined subscriber tasks of the defined group task that are performed by the ecosystem of devices to obtain respective mapped results of the performed respective defined subscriber tasks; and storing the mapped results in the data storage device.

In turn, in embodiment(s), the machine learning component can determine, via the classifier(s) using the stored mapped results, whether sharing the portion of the respective device capabilities with a device of the respective devices satisfies a defined condition representing an increase of a performance of a defined group task that is to be performed by the ecosystem of devices and/or that is being performed by the ecosystem of devices.

In this regard, in response to the machine learning component determining that sharing the portion of the respective device capabilities satisfies the defined condition representing the increase of the performance of the defined group task, the machine learning component sends a recommendation directed to the subscriber identity requesting approval of the sharing based on subscriber user input, and/or automatically shares the portion of the respective device capabilities with the device to facilitate an increase of the performance of the defined group task.

Figure 6:
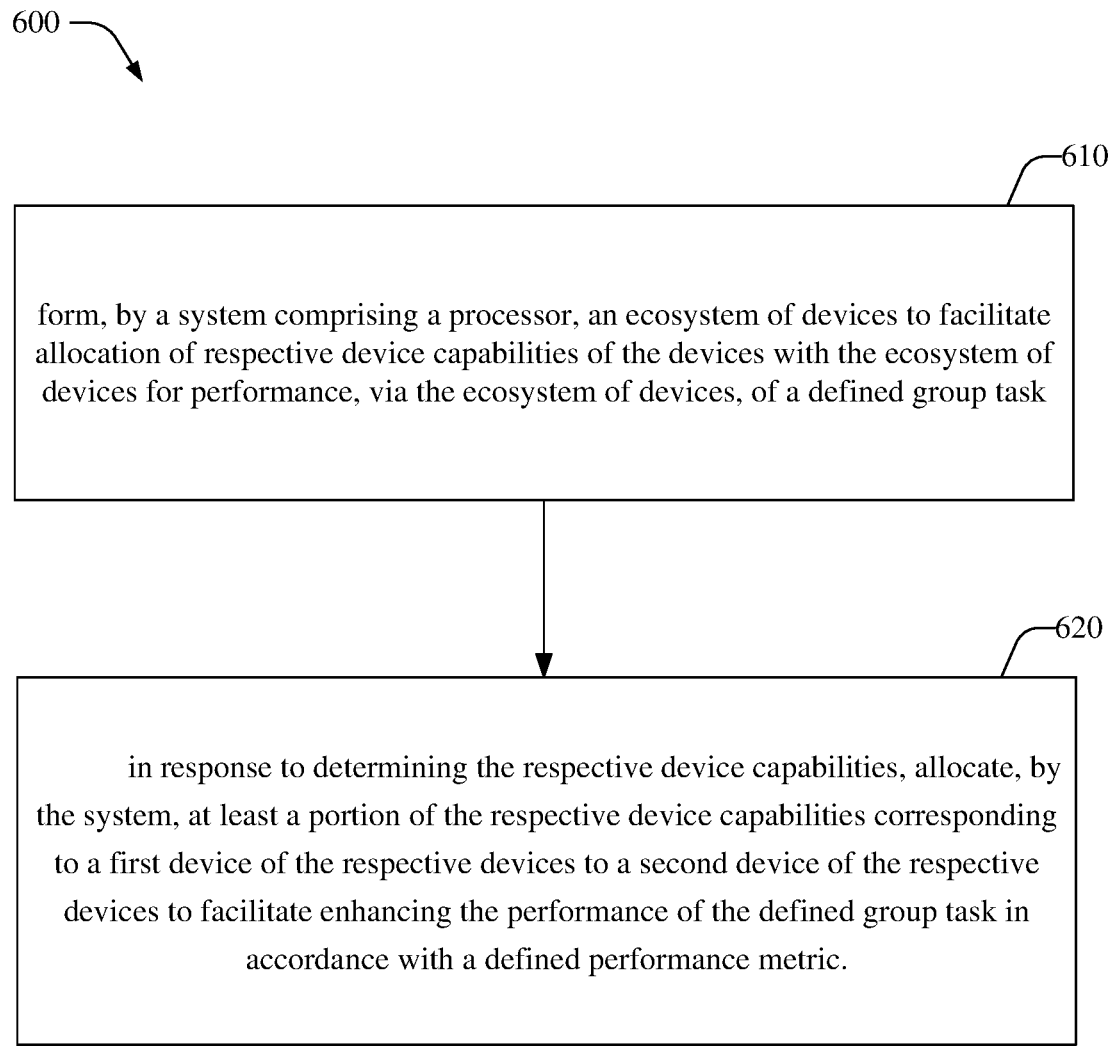
FIG. 6 illustrates a flowchart of a method for facilitating improvement of a performance of a defined group task of an ecosystem of devices, in accordance with various example embodiments.
Figure 7:
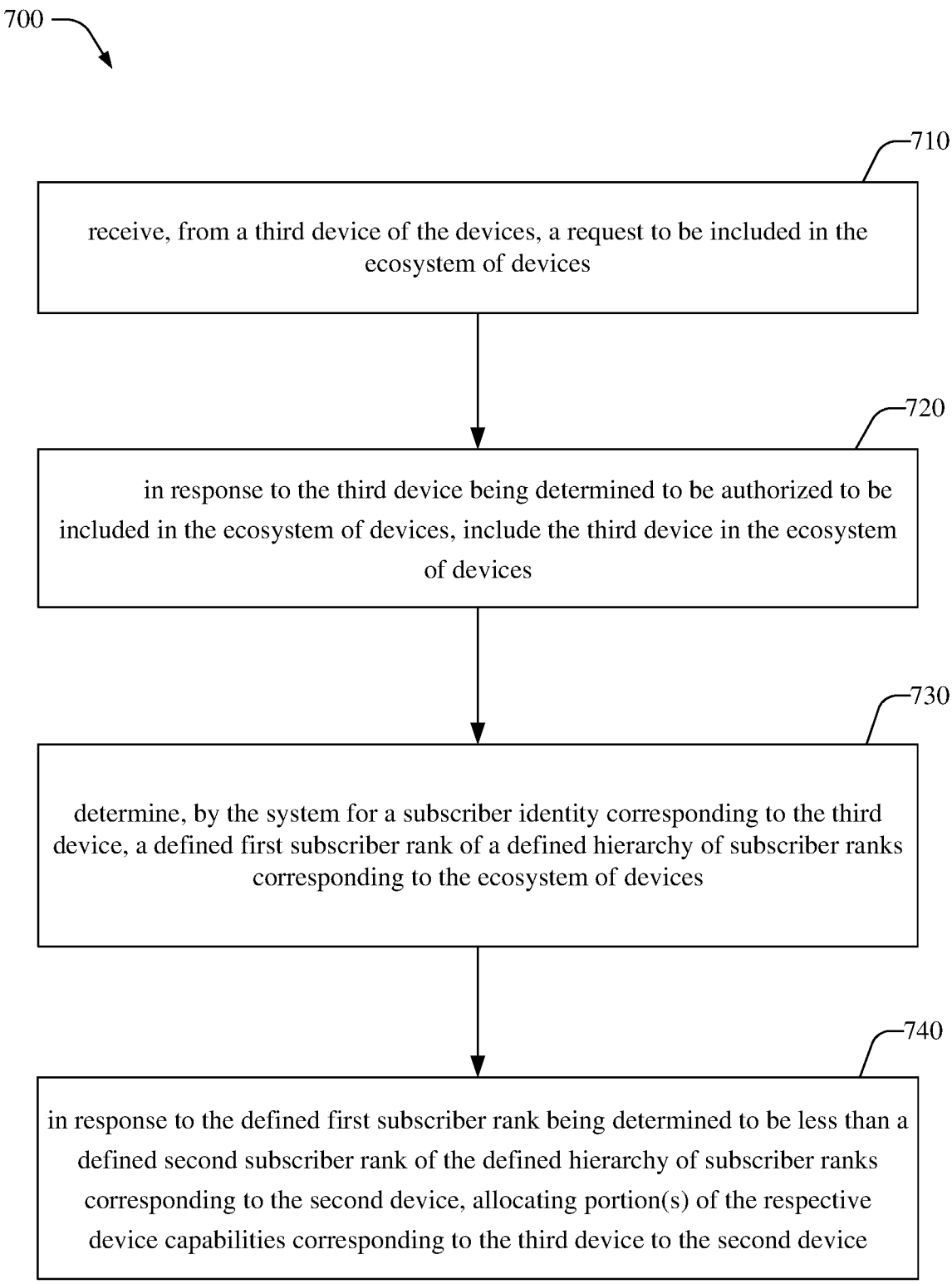
FIG. 7 illustrates a flow chart of a method associated with authorization of a device to be included in an ecosystem of devices corresponding to a defined hierarchy of subscriber ranks, in accordance with various example embodiments.
Figure 8:
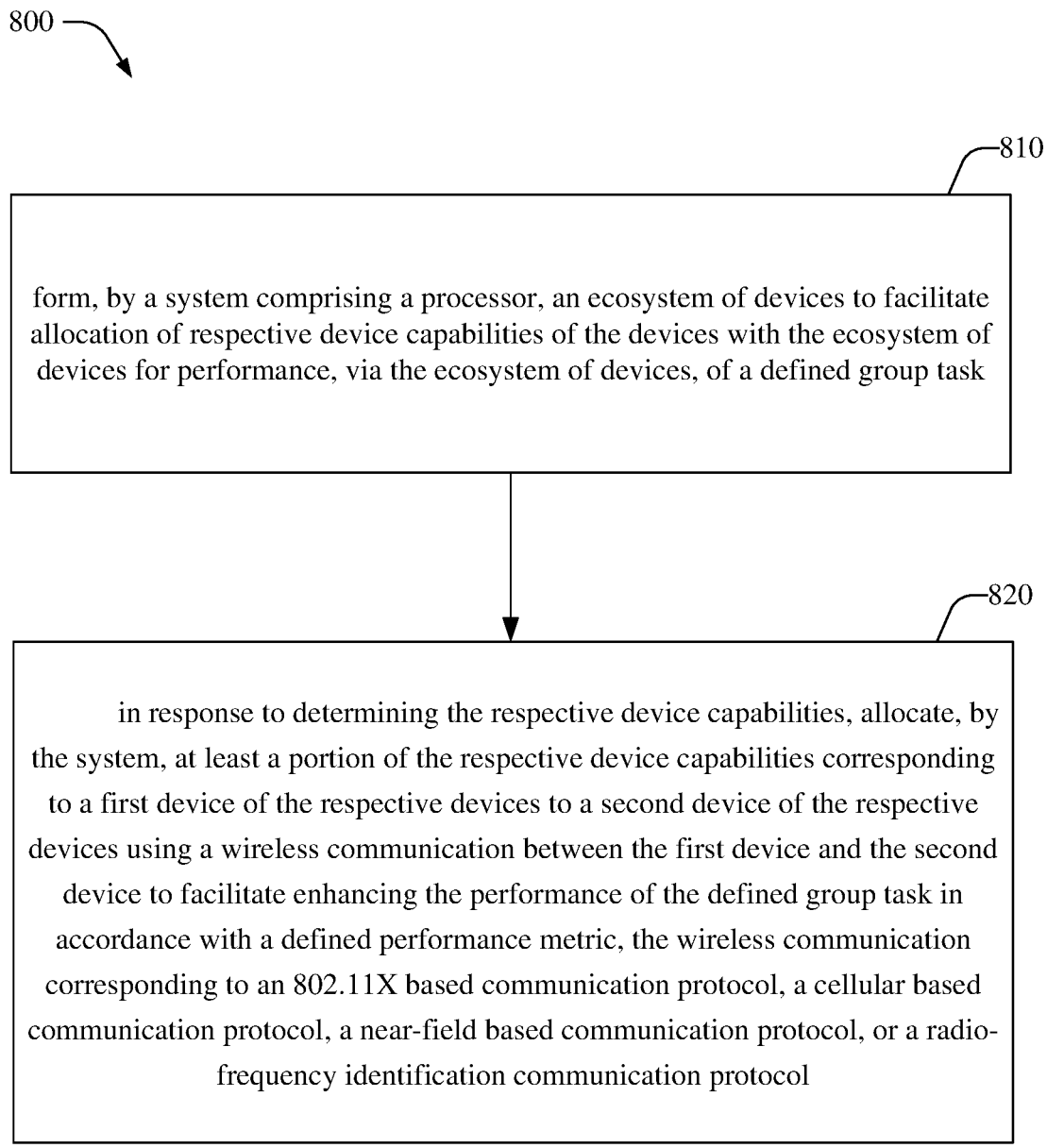
FIG. 8 illustrates a flow chart of another method for facilitating improvement of a performance of a defined group task of an ecosystem of devices, in accordance with various example embodiments.

FIGS. 6-8 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 illustrates a flowchart of a method for facilitating improvement of a performance of a defined group task of an ecosystem of devices, in accordance with various example embodiments. At 610, a system (110) comprising a processor forms an ecosystem of devices to facilitate allocation of respective device capabilities of the devices with the ecosystem of devices for performance, via the ecosystem of devices, of a defined group task.

At 620, in response to determining the respective device capabilities, the system allocates at least a portion of the respective device capabilities corresponding to a first device of the respective devices to a second device of the respective devices to facilitate enhancing the performance of the defined group task in accordance with a defined performance metric.

FIG. 7 illustrates a flow chart of a method associated with authorization of a device to be included in an ecosystem of devices (101) corresponding to a defined hierarchy of subscriber ranks, in accordance with various example embodiments. At 710, the system (110) receives, from a third device of the devices, a request to be included in the ecosystem of devices.

At 720, in response to the third device being determined to be authorized to be included in the ecosystem of devices, the system includes the third device in the ecosystem of devices.

At 730, the system determines, for a subscriber identity corresponding to the third device, a defined first subscriber rank of a defined hierarchy of subscriber ranks corresponding to the ecosystem of devices.

At 740, in response to the defined first subscriber rank being determined to be less than a defined second subscriber rank of the defined hierarchy of subscriber ranks corresponding to the second device, the system allocates portion(s) of the respective device capabilities corresponding to the third device to the second device.

FIG. 8 illustrates a flow chart of another method for facilitating improvement of a performance of a defined group task of an ecosystem of devices, in accordance with various example embodiments. At 810, a system (110) comprising a processor forms an ecosystem of devices to facilitate allocation of respective device capabilities of the devices with the ecosystem of devices for performance, via the ecosystem of devices, of a defined group task.

At 820, in response to determining the respective device capabilities, the system allocates at least a portion of the respective device capabilities corresponding to a first device of the respective devices to a second device of the respective devices using a wireless communication between the first device and the second device to facilitate enhancing the performance of the defined group task in accordance with a defined performance metric, the wireless communication corresponding to an 802.11X based communication protocol, a cellular based communication protocol, a near-field based communication protocol, or a radio-frequency identification communication protocol.

Figure 9:
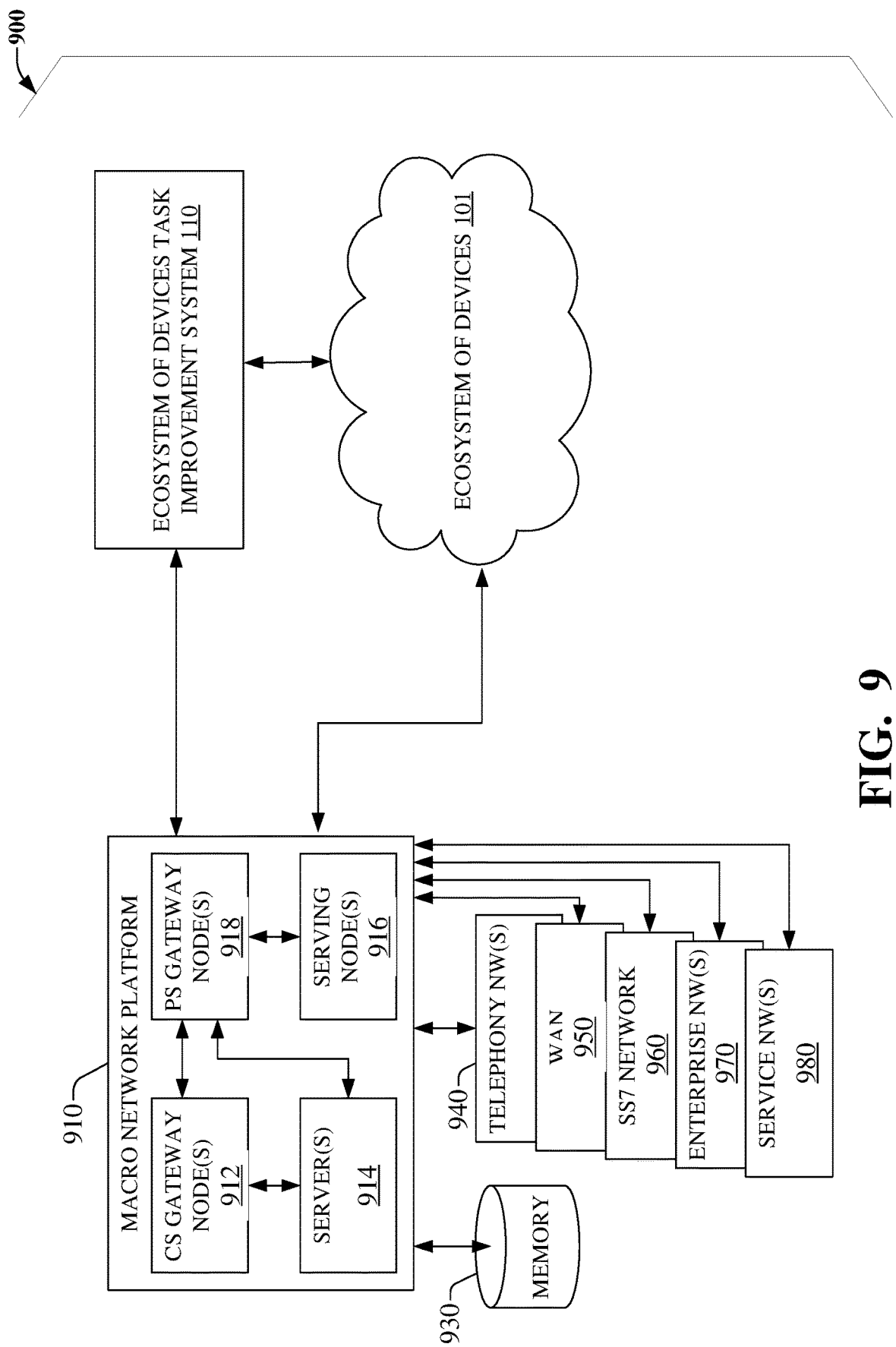
FIG. 9 illustrates a block diagram of a wireless network environment including an ecosystem of devices task improvement system environment that facilitates improvement of a performance of a defined group task of the ecosystem of devices, in accordance with various example embodiments.

Referring now to FIG. 9, a block diagram of a wireless network environment (900) including an ecosystem of devices task improvement system (110) that facilitates improvement of a performance of a defined group task of the ecosystem of devices is illustrated, in accordance with various example embodiments. The wireless network environment includes a macro network platform (910), e.g., of a service provider core network (not shown), that serves or facilitates communication with ecosystem of devices 101.

Generally, macro network platform 910 includes components, e.g., nodes, GWs, interfaces, servers, policy servers, and platforms that facilitate both packet-switched (PS), e.g., IP, frame relay, asynchronous transfer mode (ATM), and circuit-switched (CS) traffic, e.g., voice and data, and control generation for networked wireless communication, e.g., via ecosystem of devices task improvement system 110. In various embodiments, macro network platform 910 includes CS gateway (GW) node(s) 912 that can interface CS traffic received from legacy networks like telephony network(s) 940, e.g., public switched telephone network (PSTN), public land mobile network (PLMN), Signaling System No. 7 (SS7) network 960. CS GW node(s) 912 can authorize and authenticate traffic, e.g., voice, arising from such networks. Additionally, CS GW node(s) 912 can access mobility or roaming data generated through SS7 network 960; for instance, mobility data stored in a visitor location register (VLR), which can reside in memory 930. Moreover, CS GW node(s) 912 interfaces CS-based traffic and signaling with PS GW node(s) 918. As an example, in a 3GPP UMTS network, PS GW node(s) 918 can be embodied in GW general packet radio service (GPRS) support node(s) (GGSN).

As illustrated by FIG. 9, PS GW node(s) 918 can receive and process CS-switched traffic and signaling via CS GW node(s) 912. Further PS GW node(s) 918 can authorize and authenticate PS-based data sessions, e.g., via ecosystem of devices task improvement system environment (100), with served devices, communication devices, and/or other devices. Such data sessions can include traffic exchange with networks external to macro network platform 910, like wide area network(s) (WANs) 950; enterprise networks (NWs) 970, e.g., E911, service NW(s) 980, e.g., an IP multimedia subsystem (IMS). It should be appreciated that local area network(s) (LANs), which may be a part of enterprise NW(s) 970, can also be interfaced with macro network platform 910 through PS GW node(s) 918. PS GW node(s) 918 can generate packet data contexts when a data session is established, e.g., associated with an EPS bearer context activation. To that end, in an aspect, PS GW node(s) 918 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), PS GW node(s) 918 (e.g., GGSN) and tunnel interface (e.g., TTG) comprise a packet data GW (PDG).

Macro network platform 910 also includes serving node(s) 916 that can convey the various packetized flows of information, or data streams, received through PS GW node(s) 918. As an example, in a 3GPP UMTS network, serving node(s) can be embodied in serving GPRS support node(s) (SGSN).

As indicated above, server(s) 914 in macro network platform 910 can execute numerous applications, e.g., messaging, location services, wireless device management that can generate multiple disparate packetized data streams or flows; and can manage such flows, e.g., schedule, queue, format. Such application(s), for example, can include add-on features to standard services provided by macro network platform 910. Data streams can be conveyed to PS GW node(s) 918 for authorization/authentication and initiation of a data session, and to serving node(s) 916 for communication thereafter. Server(s) 914 can also affect security, e.g., implement one or more firewalls, of macro network platform 910 to ensure network's operation and data integrity in addition to authorization and authentication procedures that CS GW node(s) 912 and PS GW node(s) 918 can enact. Moreover, server(s) 914 can provision services from external network(s), e.g., WAN 950, or global positioning system (GPS) network(s), which can be a part of enterprise NW(s) 980. It is to be noted that server(s) 914 can include one or more processors configured to confer at least in part the functionality of macro network platform 910. To that end, the one or more processors can execute code instructions stored in memory 930, for example.

In other embodiments, server(s) 910 can comprise policy server(s) to affect configuring, re-configuring, and/or provisioning of a wireless device (e.g., 104, 114, 124) to facilitate a use of a service, e.g., a wireless service, a multimedia service, or other service corresponding to a social, gaming, immersive (e.g., AR-based, VR-based, MR-based, XR-based) and/or multimedia-based service.

In core network environment 900, memory 930 can store information related to operation of macro network platform 910, e.g., related to operation of a wireless device (e.g., 104, 114, 124) and/or ecosystem of devices task improvement system 110. The information can include data, e.g., business data, associated with subscribers of respective services; market plans and strategies, e.g., promotional campaigns, business partnerships, mobile devices served through macro network platform; service and privacy information, policies; end-user service logs for law enforcement; term(s) and/or condition(s) associated with wireless service(s) provided via service provider network. Memory 930 can also store information from at least one of telephony network(s) 940, WAN 950, SS7 network 960, enterprise NW(s) 970, or service NW(s) 980.

In one or more embodiments, components of core network environment 900 can provide, e.g., communication services (e.g., a wireless service, a multimedia service, or other service corresponding to a social, gaming, immersive (e.g., AR-based, VR-based, MR-based, XR-based) and/or multimedia-based service), to the wireless device via an over-the-air wireless link corresponding to a radio access network (RAN) (not shown). In this regard, the RAN can include one or more: macro, Femto, or pico access points (APs), base stations (BS), landline networks (e.g., optical landline networks, electrical landline networks) communicatively coupled between the wireless device and macro network platform 910.

Core network environment 900 can include one or more of the Internet (or another communication network (e.g., IP-based network)), or DSL-type or broadband network facilitated by Ethernet or other technology. In various embodiments, core network environment 900 can include hardware and/or software for allocating resources to the wireless device and ecosystem of devices task improvement system 110, converting or enforcing protocols, facilitating modification of communication policies for the wireless device, establishing and/or providing levels of quality of service (QoS), e.g., based on such communication policies, providing applications or services, translating signals, and/or performing other desired functions to facilitate system interoperability and communication to/from the wireless device and a service provider core network corresponding to core network environment 900.

In other embodiment(s), core network environment 900 can include data store component(s), a memory configured to store information, computer-readable storage media storing computer-executable instructions, e.g., memory 930, enabling various operations performed via ecosystem of devices task improvement system 110 as described herein.

As it employed in the subject specification, the terms "processing component" and "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

In the subject specification, terms such as "memory", "memory component", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory component 240, ecosystem of devices registration data store 320, machine learning library component 520, memory 930, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
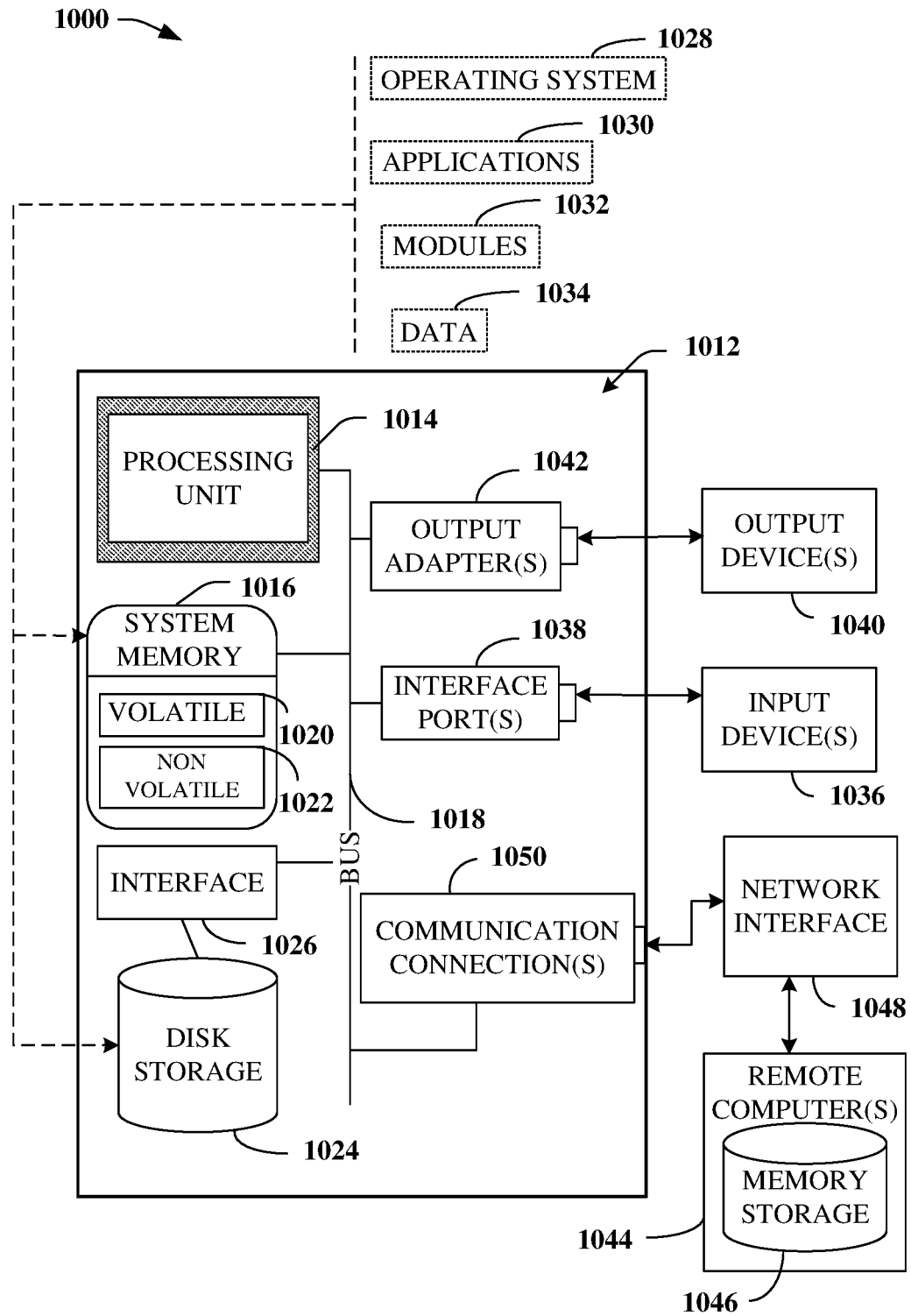
FIG. 10 is a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules include routines, programs, components, and/or data structures that perform particular tasks and/or implement particular abstract data types.

Moreover, those skilled in the art will appreciate that the inventive systems can be practiced with other computer system configurations, including single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture (ISA), microchannel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 includes volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 include, for example, a serial port, a parallel port, a game port, a universal serial bus (USB), a wireless based port, e.g., WiFi, Bluetooth. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 include, by way of illustration and not limitation, cards and/or video and sound devices that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device (e.g., 1046) is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies include fiber distributed data interface (FDDI), copper distributed data interface (CDDI), Ethernet, token ring and the like. WAN technologies include, but are not limited to, point-to-point links, circuit-switching networks like integrated services digital networks (e.g., ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth wireless technologies. Thus, the communication can be a predefined structure as with a conventional network or simply an ad hoc communication between at least two devices.

WiFi allows connection to the Internet from a desired location (e.g., couch at home, a bed in a hotel room, a conference room at work) without wires. WiFi is a wireless technology similar to that used in a cell phone that enables such devices, e.g., mobile phones, computers, to send and receive data indoors and out, anywhere within the range of a base station. WiFi networks use radio technologies called IEEE 802.11 (a, b, g, and so on) to provide secure, reliable, fast wireless connectivity. A WiFi network can be used to connect devices (e.g., mobile phones, computers) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, and process blocks can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., 4G, 5G, and beyond, IEEE 802.XX technology, e.g., Wi-Fi, Bluetooth; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct.

Further, selections of a radio technology, or radio access technology, can include second generation (2G), third generation (3G), fourth generation (4G), fifth generation (5G), $x^{th}$ generation, and so on evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., UE, and/or within one or more elements of a network infrastructure, e.g., radio network controller, wireless access point (AP).

Moreover, terms like "user equipment", "wireless device", "mobile station", "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber (e.g., 106, 116, 126) of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., an ecosystem of devices task improvement system environment (100), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless system e.g., a wireless communication device (e.g., 104, 114, 124), for systems, methods, and/or apparatus disclosed herein can include a mobile device; a mobile phone; a 4G, 5G, and beyond device; a cellular communication device; a PSTN phone; a cellular communication device; a cellular phone; a satellite communication device; a satellite phone; a VoIP phone; a WiFi phone; a dual-mode cellular/WiFi phone; a combination cellular/VoIP/WiFi/WiMAX phone; a portable computer; or any suitable combination thereof. Specific examples of a wireless system can include, but are not limited to: a cellular device, such as a GSM, TDMA, CDMA, IS-95 and/or iDEN phone; a cellular/WiFi device, such as a dual-mode GSM, TDMA, IS-95 and/or iDEN/VoIP phone; UMTS phones; UMTS VoIP phones; or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s);

optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, and/or explicit data. Inference can be employed to identify a specific context or action, or can generate a probability distribution over states of interest based on a consideration of data and events, for example.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising:
    a processor; and
    a memory that stores executable instructions that, when executed by the processor cause the system to execute operations comprising:
        performing a first defined group task by a device group, resulting in a first performance;
        transferring a first capability of a first device to a second device, wherein the first device and the second device are members of the device group;
        storing, in a data storage device, a mapping of the transferring with the first performance, wherein the storing and the mapping are based on a machine learning model, and wherein the transferring facilitates a first increase of the first performance of the first defined group task by the device group; and
        in response to the mapping indicating that transferring the first capability to a third device corresponding to a subscriber satisfies a first defined condition representing a second increase of a second performance of a second defined group task that is at least one of to be performed by the device group or being performed by the device group:
            sending, according to the machine learning model, a recommendation to the subscriber requesting approval to transfer the first capability to the third device based on a user input of the subscriber, wherein the third device is a member of the device group.

2. The system of claim 1, wherein the first capability comprises at least one of:
    a processing resource corresponding to a processing device of the first device,
    a memory resource corresponding to a memory device of the first device, or
    a communication resource corresponding to a data transfer rate of a communication device of the first device.

3. The system of claim 2, wherein transferring the first capability comprises:
    transferring, via a wireless communication between the first device and the second device, the first capability to the second device, and wherein the wireless communication corresponds to an 802.11X based communication protocol or a cellular based communication protocol.

4. The system of claim 2, wherein the first defined group task corresponds to an immersive experience application comprising at least one of: a gaming application, an educational application, a streaming application, a cryptocurrency application, or a connected car application.

5. The system of claim 1, wherein transferring the first capability to the second device comprises:
    transferring the first capability to the second device when:
        a plurality of capabilities of the first device is greater than a plurality of capabilities of the second device, and
        a second defined condition representing an increase of a device performance of the second device with respect to the first increase of the first performance of the first defined group task is satisfied.

6. The system of claim 1, wherein the operations further comprise:
    transferring the first capability from the second device to the third device when a third defined condition representing an increase of a device performance of the third device with respect to the first defined group task is satisfied.

7. The system of claim 1, wherein the operations further comprise:
    receiving, from a fourth device, a request to be included as a member of the device group, wherein the fourth device is included in the device group when the fourth
device is authorized to be included in the device group.

8. The system of claim 7, wherein
the device group is associated with at least one of:
a defined subscriber task of the second defined group task to be performed by the device group, or
a defined subscriber rank of a defined hierarchy of subscriber ranks.

9. The system of claim 8, wherein transferring the first capability to the second device comprises:
transferring the first capability to the second device when a first subscriber rank of the defined hierarchy of subscriber ranks associated with the first device is less than a second subscriber rank of the defined hierarchy of subscriber ranks associated with the second device.

10. The system of claim 1, wherein the
mapping further maps a plurality of device capabilities of the first device with the first performance of the first defined group task.

11. The system of claim 1, wherein when the mapping indicates that transferring the first capability to the third device satisfies the first defined condition, the operations further comprise:
transferring the first capability to the third device to facilitate the second increase of the second performance of the second defined group task by the device group.

12. A method executed by a system comprising a processor, the method comprising:
performing a first defined group task by an ecosystem of devices, resulting in a first performance;
transferring a first capability of a first device to a second device, wherein the first device and the second device are members of the ecosystem;
storing, in a data storage device, a mapping of the transferring with the first performance, wherein the storing and the mapping are based on a machine learning model, and wherein the transferring facilitates a first enhancement of the first performance of the first defined group task in accordance with a defined performance metric; and
in response to the mapping indicating that transferring the first capability to a third device corresponding to a subscriber satisfies a first defined condition representing a second enhancement of a second performance of a second defined group task that is at least one of to be performed by the ecosystem or being performed by the ecosystem:
sending, according to the machine learning model, a recommendation to the subscriber requesting approval to transfer the first capability to the third device based on a user input of the subscriber, wherein the third device is a member of the ecosystem.

13. The method of claim 12, wherein when the mapping indicates that transferring the first capability to the third device satisfies the first defined condition, the method further comprises:
transferring the first capability to the third device to facilitate the second enhancement of the second performance of the second defined group task by the ecosystem.

14. The method of claim 12, further comprising:
receiving, from a fourth device, a request to be included as a member of the ecosystem of devices, wherein the fourth device is included in the ecosystem when the fourth device is authorized to be included in the ecosystem.

15. The method of claim 14,
wherein the ecosystem is associated with a defined subscriber rank of a defined hierarchy of subscriber ranks.

16. The method of claim 15, wherein transferring the first capability to the second device comprises:
transferring the first capability to the second device when a first subscriber rank of the defined hierarchy of subscriber ranks associated with the first device is less than a second subscriber rank of the defined hierarchy of subscriber ranks associated with the second device.

17. The method of claim 12, wherein transferring the first capability from the first device to the second device facilitates enhancing of at least one of: a processing capability of the second device, a memory storage capability of the second device, or a data transfer capability of the second device.

18. The method of claim 12, wherein transferring the first capability from the first device further comprises:
transferring the first capability to the second device using a wireless communication between the first device and the second device, the wireless communication corresponding to a near-field based communication protocol or a radio-frequency identification communication protocol.

19. A non-transitory machine-readable medium comprising executable instructions that, when executed by a processor of a computing system, cause the computing system to execute operations comprising:
performing a first defined group task by a group of devices, resulting in a first performance;
transferring a first capability of a first device to a second device, wherein the first device and the second device are members of the group of devices;
storing, in a data storage device, a mapping of the transferring with the first performance, wherein the storing and the mapping are based on a machine learning model, and wherein the transferring facilitates a first optimization of the first performance of the first defined group task by the group of devices; and
in response to the mapping indicating that transferring the first capability to a third device corresponding to a subscriber satisfies a first defined condition representing a second optimization of a second performance of a second defined group task that is at least one of to be performed by the group of devices or being performed by the group of devices:
sending, according to the machine learning model, a recommendation to the subscriber requesting approval to transfer the first capability to the third device based on a user input of the subscriber, wherein the third device is a member of the group of devices.

20. The non-transitory machine-readable medium of claim 19, wherein the transferring further comprises:
transferring the first capability based on respective device ranks of a defined hierarchy of ranks that are associated with the group of devices.

* * * * *